June 27, 1950     J. F. LINDEN     2,513,033
HAND CULTIVATOR
Filed Aug. 17, 1946
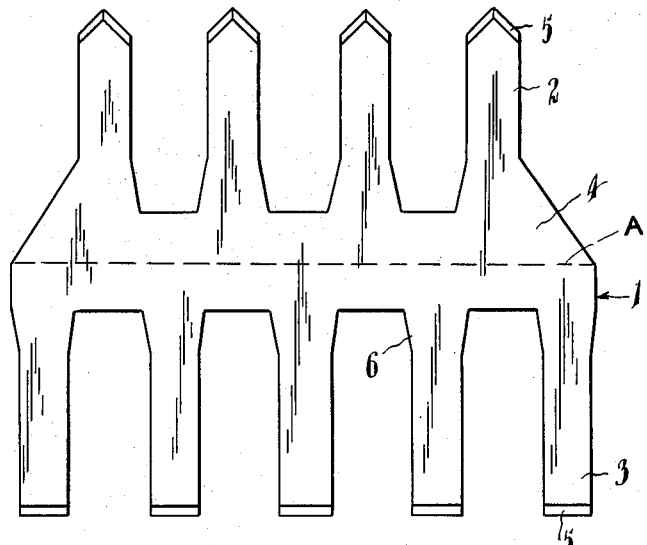
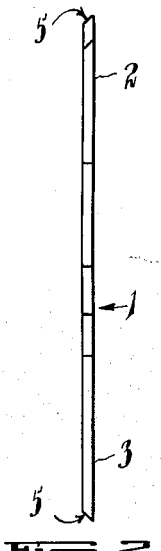
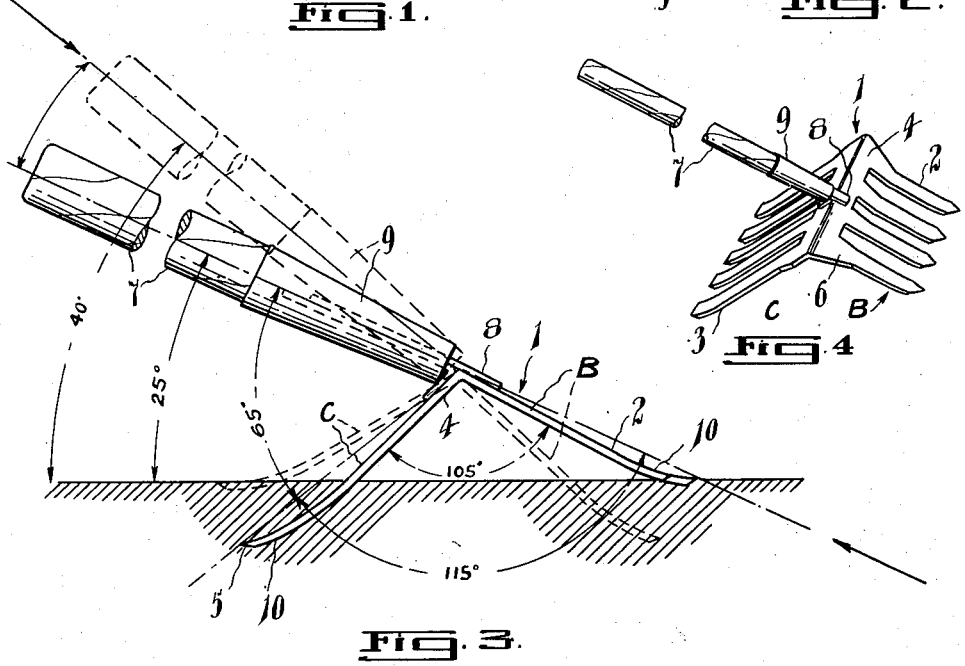
Inventor
John F. Linden
by Frederick E. Bromley
ATTY.

Patented June 27, 1950

2,513,033

UNITED STATES PATENT OFFICE 2,513,033

HAND CULTIVATOR

John F. Linden, Toronto, Ontario, Canada

Application August 17, 1946, Serial No. 691,315

1 Claim. (Cl. 97—71)

My invention appertains to hand cultivating tools and has for its object the provision of a novel construction and arrangement of a tool of this character particularly suited for manual operation on ground previously worked in preparation for a seed bed, and one which is also adapted for performing operations usually required in gardening, such as weeding between rows of crops and breaking up crusts of sun-baked top soil about growing plants.

In hand tools of the prior art, such as hoes and scrapers, it has been proposed to provide the heads with uninterrupted cutting blades or with teeth as in an ordinary rake, and in the heavy type of hand tools of this kind, such as hand cultivators, it has been proposed to equip the head or frame portion with claws. Implements of this type which are known to me have the shortcoming that they can be usefully operated only in one direction of movement, as by their being pulled toward the user. This one-way operation of the hand tool is necessarily laborious and slow. Moreover it takes considerable time and effort to cultivate a piece of ground of any size by a tool that can only be used in this way inasmuch as the tool is only suited to be conveniently worked by short slow strokes and the results are not always as effective as they might be.

Hence it is an object of the present invention to provide a hand tool which is adapted to be usefully manipulated in a two-way operation; to wit, one in which work is performed as the implement is pushed away from the operator as well as when pulled toward him in alternate working strokes forming a continuous operation that obviates the need of raising the tool from the ground.

A further object of the invention is to provide a more efficient and serviceable hand tool for the purpose described which can be manufactured at low cost.

A practical form of the invention is described in the ensuing specification and illustrated in the accompanying drawing in which:

Fig. 1 is a plan view of the blank from which the tool is made and viewed from the surface which forms the bottom face of the tool.

Fig. 2 is a side edge view of Fig. 1.

Fig. 3 is a side view of the completed tool in the working position it occupies when being pulled backwardly in its use for cultivating purposes. In this view the tool is also indicated, in dash lines, in the position it occupies when being pushed forwardly in a cultivating movement.

Fig. 4 is a perspective view of the completed tool.

The selected form of the tool depicted in the accompanying drawing is constructed from the blank shown in Figs. 1 and 2. Said blank is desirably a stamped metal plate constituting a head, denoted as a whole by the reference character 1, which is transversely disposed with respect to the handle of the tool. At one margin of the head there is provided a plurality of teeth or claws 2 and at the opposite margin there is provided a plurality of cultivating teeth or claws 3. Each group or set of teeth extends outwardly from an intermediate base portion 4 and those of each group or set are spaced from each other a suitable distance as best shown in Fig. 1. Preferably the spaces between the teeth are of considerably greater width than the width of the teeth so that each of these claw-like teeth is adapted to cut and dig a swath or furrow much wider than the width of the individual teeth. The teeth of one group are disposed in offset relation with respect to those of the other group so that they are in longitudinal alignment with the spaces between the teeth of the other group. With this arrangement the teeth of one section when merely gliding over the ground surface are in position for crushing and smoothing out the ridges which have been formed in spaced relation by the preceding digging action of the opposite toothed section, thus leaving a thoroughly worked and level top soil surface. The teeth of both groups are beveled, as at 5, and these bevel faces are disposed at the inner surface of the completed tool as will be clearly observed from an inspection of Fig. 3.

Preferably the proximal end portions of all the teeth are of increased width, as indicated at 6, in order to strengthen them at their juncture with the base portion 4. The head is bent about a bend line A, Fig. 1, through its base portion 4 in order to form it into a V-shaped member. The whole of that part of the head at one side of the line along which it is bent serves as a front toothed section B and the whole of the remaining part serves as a rear toothed section C.

The head is provided with a straight rigid handle 7 fixed to its base portion 4 in approved manner as by the tang element 8 which for instance may be made up of one or more pieces of strip metal welded or otherwise connected to the head to project from its bight portion for interfitting engagement with the handle. The handle may be supplied with a ferrule 9 as customary. While I have described one mode of attaching the head to the handle it will be apparent to those skilled in the art that other expedients may be resorted to for this purpose without departing from the spirit and scope of the invention.

With particular reference to Fig. 1, it will be seen that the sections B and C of the head extend divergently in a general downward direction and have their teeth curved outwardly for about half of their length as indicated at 10. The inner straight portions of the teeth lie at an angle of approximately 105° having regard to the divergency of the said sections, and the points or distal ends of the teeth lie at an angle of approximately 115°, this angle being defined by lines projected from the bight of the V-shaped head. The axis of the handle is disposed at an angle of approximately 65° with respect to the points or distal ends of the teeth of the rear section and therefore the axis is substantially in alignment with the teeth of the front section.

In the use of the tool it is alternately drawn backwardly and pushed forwardly in a continuous motion without raising it from the ground. In the pulling stroke the handle may be conveniently held at an angle of about 25° with the ground. In this stroke the teeth of the rear section C penetrate the soil for a desirable depth for working it and at the same time the teeth of the front section glide over the surface of the ground without causing any hindrance but having the beneficial effect of tending to regulate the working depth of the rear teeth. A similar result ensues in the forward stroke of the tool. In this stroke the angle of slope of the handle is increased to about 40° and at this inclination the rear teeth are elevated to the ground surface, which causes the front teeth to penetrate the ground to the required depth for operative action. The curved portions of the rear teeth readily slide over the ground and serve to preclude the front teeth from digging in the ground excessively. A study of Fig. 3 will render the operative actions of the tool quite clear, and the advantages and utility of the construction will be manifest. It will be gathered that during the alternate push and pull strokes the tool fulcrums about the bight or central portion of the head as the working ends of the groups of teeth are alternately lowered and raised. The push and pull movements of the tool are similar to the act of mopping a floor. A distinctive feature of the tool is that it can be operated with considerable speed because it is adapted to rest on the ground while being used. Therefore the movements may be rapidly made and with great ease, requiring but little effort as compared to a conventional tool of this kind.

A tool constructed as herein described with the teeth inclined and arranged as set forth will efficiently break up soil and leave the ground surface smooth and level. The teeth will penetrate the ground for a substantial portion of their length but at a moderate depth. The movements of the tool over the ground as herein recounted tend to preclude the points of the teeth from becoming dulled, which obviates the need for resharpening the same.

While the tool has been disclosed in a form which is considered to be most suitable, it will be manifest that incidental changes and modifications may be resorted to as come within the scope of the invention as expressed in the accompanying claim.

What I claim is:

In a cultivating tool, a handle, and a head rigid therewith, said head comprising a transverse base provided with thin flat teeth arranged in a front set and a rear set, the teeth of each set being disposed in spaced parallel relation, the front teeth projecting forwardly and being curved at their free ends upwardly away from said rear teeth, the rear teeth projecting downwardly at a substantial backward angle to the axis of said handle but less than a right angle and being upwardly curved at their free ends away from said front teeth; the arrangement providing a structure in which the rear teeth are operable to slide over the ground to regulate working depth of the front teeth when the handle is propelled at an inclination in a forward stroke with the front teeth penetrating the soil, the front teeth being likewise operable to slide over the ground to regulate the working depth of the rear teeth when the handle is pulled in a return stroke and lowered to engage the rear teeth in the soil.

JOHN F. LINDEN.

REFERENCES CITED

The following references are of record in the file of this patent:

UNITED STATES PATENTS

| Number | Name | Date |
|---|---|---|
| 275,915 | Humphrey | Apr. 17, 1883 |
| 890,991 | Marsh | June 16, 1908 |
| 1,352,386 | Rundberg | Sept. 7, 1920 |
| 1,717,975 | Higgins | June 18, 1929 |